(12) United States Patent
Zhu et al.

(10) Patent No.: US 11,015,844 B2
(45) Date of Patent: May 25, 2021

(54) SEMICONDUCTOR REFRIGERATION CUP

(71) Applicant: XIAMEN PALTIER ELECTRONIC TECHNOLOGY CO., LTD, Fujian (CN)

(72) Inventors: Zonghu Zhu, Fujian (CN); Xianyan Long, Fujian (CN); Chunyan Lu, Fujian (CN)

(73) Assignee: XIAMEN PALTIER ELECTRONIC TECHNOLOGY CO., LTD, Xiamen (CN)

( * ) Notice: Subject to any disclaimer, the term of this patent is extended or adjusted under 35 U.S.C. 154(b) by 70 days.

(21) Appl. No.: 16/577,255

(22) Filed: Sep. 20, 2019

(65) Prior Publication Data

US 2021/0010722 A1    Jan. 14, 2021

(30) Foreign Application Priority Data

Jul. 10, 2019 (CN) .......................... 201921071687.2

(51) Int. Cl.
*F25B 21/02* (2006.01)
(52) U.S. Cl.
CPC .................................. *F25B 21/02* (2013.01)
(58) Field of Classification Search
CPC ...... F25B 21/02; H01L 23/38; H01L 23/3677; H01L 21/4871; H01L 23/467; H01L 23/473; H05K 7/20272; H05K 7/20254; H05K 7/20263

USPC ............................................................ 62/3.7
See application file for complete search history.

(56) References Cited

U.S. PATENT DOCUMENTS

| 5,918,469 | A | * | 7/1999 | Cardella | ............ H05K 7/20254 |
| | | | | | 165/80.3 |
| 6,359,781 | B1 | * | 3/2002 | Hoss | .......................... G06F 1/20 |
| | | | | | 165/104.33 |
| 2005/0183846 | A1 | * | 8/2005 | Mok | .................... H01L 23/3672 |
| | | | | | 165/104.33 |
| 2011/0122579 | A1 | * | 5/2011 | Huisman | ................. H01L 33/64 |
| | | | | | 361/691 |
| 2020/0033399 | A1 | * | 1/2020 | Wu | ..................... G01R 31/2849 |

\* cited by examiner

*Primary Examiner* — Davis D Hwu

(57) ABSTRACT

A semiconductor refrigeration assembly includes a semiconductor refrigeration assembly, a heat-dissipation member, a cup body, and a base. The semiconductor refrigeration assembly is embedded in the bottom wall of the cup body and has an end exposed out of the cup body. The heat-dissipation member is arranged over the bottom of the cup body and abuts against the end, located outside the cup body, of the semiconductor refrigeration assembly. The base is configured to support the heat-dissipation member and to supply power to the semiconductor refrigeration assembly. The semiconductor refrigeration cup has a better heat-dissipation effect.

6 Claims, 2 Drawing Sheets

SEMICONDUCTOR REFRIGERATION CUP

CROSS REFERENCE TO RELATED APPLICATIONS

The present application claims the benefit of Chinese Patent Application No. 201921071687.2 filed on Jul. 10, 2019, the contents of which are incorporated herein by reference in their entirety.

TECHNICAL FIELD

The utility model relates to the technical field of refrigeration cups, in particular to a semiconductor refrigeration cup.

DESCRIPTION OF RELATED ART

Semiconductor refrigeration cups are simple in appearance, small in size, and convenient to carry. However, the heat-dissipation effect of semiconductor refrigeration cups on the present market is still unsatisfactory.

BRIEF SUMMARY OF THE UTILITY MODEL

The technical issue to be settled by the utility model is to provide a semiconductor refrigeration cup which has a better heat-dissipation effect.

The technical solution adopted by the utility model to settle the above technical issue is as follows:

A semiconductor refrigeration cup comprises a semiconductor refrigeration assembly, a heat-dissipation member, a cup body, and a base, wherein the semiconductor refrigeration assembly is embedded in the bottom wall of the cup body and has an end exposed out of the cup body;

The heat-dissipation member is arranged over the bottom of the cup body and abuts against the end, located outside the cup body, of the semiconductor refrigeration assembly;

The base is configured to support the heat-dissipation member and to supply power to the semiconductor refrigeration assembly; and An air duct communicated with the outside and a fan disposed in the air duct are arranged in the base, and an air outlet of the air duct faces the heat-dissipation member.

Furthermore, a groove used for containing the heat-dissipation member is formed in the base.

Furthermore, an electrode pin is arranged on a supporting face of the base, and said electrode pin is used for supporting the heat-dissipation member, a conductive electrode corresponding to the electrode pin is arranged on the heat-dissipation member and is electrically connected to the semiconductor refrigeration assembly, and the electrode pin is electrically connected to a preset external power supply.

Furthermore, the cup body comprises an inner container, a shell, and an insulation layer clamped between the inner container and the shell, and the other end of the semiconductor refrigeration assembly is attached to an outer surface of the bottom wall of the inner container.

Furthermore, a temperature sensor is clamped between the inner container and the insulation layer.

Furthermore, the semiconductor refrigeration cup further comprises a seal ring, an opening is formed in the bottom of the shell and is located around the heat-dissipation member, and the seal ring is clamped between the heat-dissipation member and the shell.

Furthermore, a foot pad is arranged at the bottom of the base, an air inlet of the air duct is located at the bottom of the base, the air outlet of the air duct is located at the top of the base, and air exhausted via the air outlet flows through the heat-dissipation member.

The utility model has the following beneficial effects: the heat-dissipation member serving as a cup bottom of the cup body is directly placed on the base, and the fan located in the base directly blows wind towards the heat-dissipation member exposed to air while the base supplies power to the semiconductor refrigeration assembly, so that heat of the heat-dissipation member is dissipated rapidly, and a better heat-dissipation effect is fulfilled.

Reference Signs:

10, cup body; 11, shell; 12, insulation layer; 13, inner container; 14, conductive electrode; 15, temperature sensor;

20, semiconductor refrigeration assembly; 21, refrigeration semiconductor;

30, seal ring;

40, heat-dissipation member;

50, base; 51, groove; 52, fan; 53, foot pad; 54, electrode pin.

DETAILED DESCRIPTION OF THE UTILITY MODEL

The technical contents, objectives, and effects of the utility model are expounded below with reference to the embodiments and accompanying drawings.

The key concept of the utility model lies in that a semiconductor refrigeration assembly is embedded in a cup body and a heat-dissipation member is arranged in a base, so that hand scalds are avoided, and the heat-dissipation effect is improved.

Figure 1:
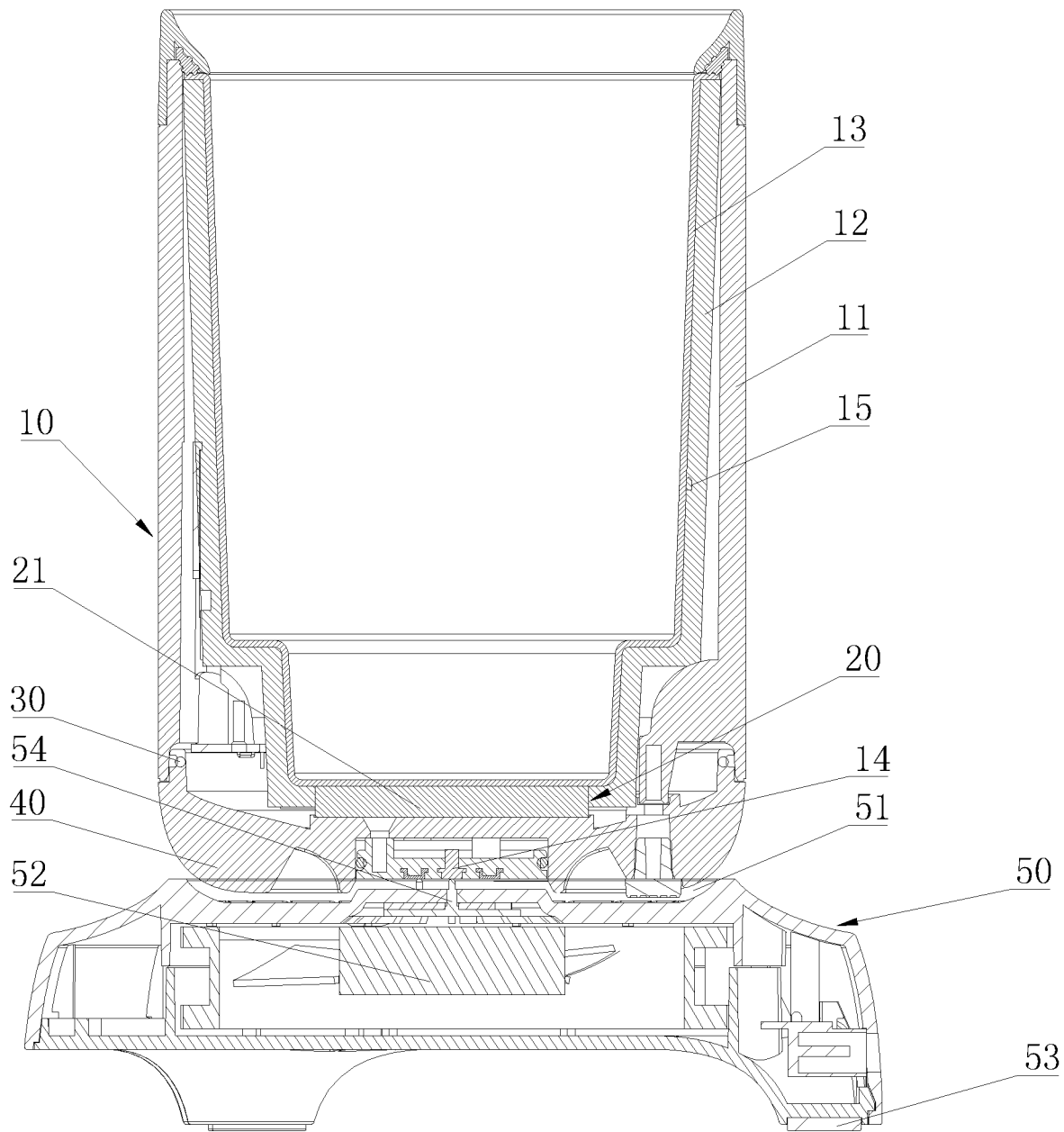
FIG. 1 is a longitudinal cross-sectional view of a semiconductor refrigeration cup in one embodiment of the utility model.
Figure 2:
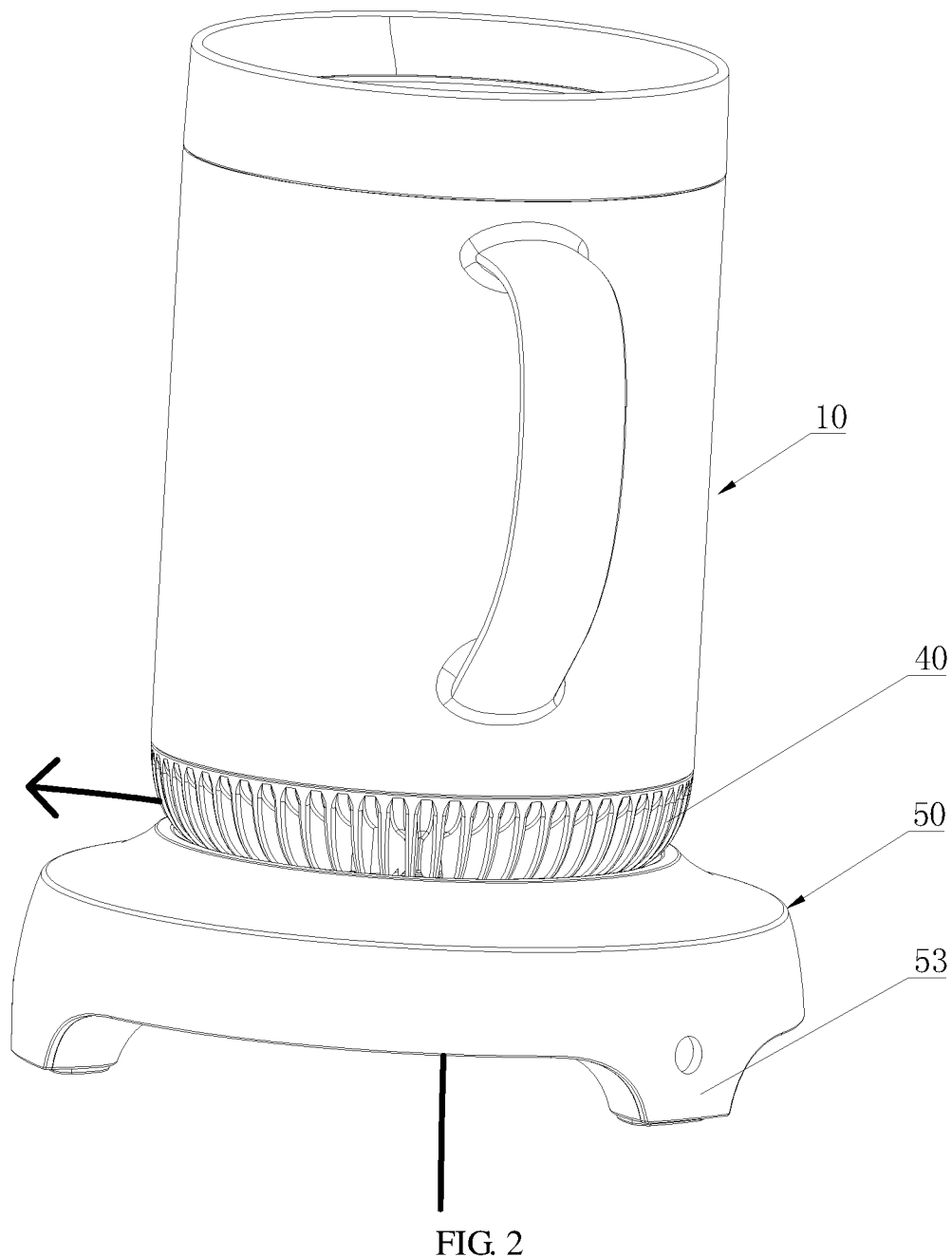
FIG. 2 is a structural view of the semiconductor refrigeration cup in the embodiment of the utility model.

Referring to FIG. 1-FIG. 2, a semiconductor refrigeration cup comprises a semiconductor refrigeration assembly 20, a heat-dissipation member 40, a cup body 10, and a base 50, wherein the semiconductor refrigeration assembly 20 is embedded in the bottom wall of the cup body 10 and has an end exposed out of the cup body 10;

The heat-dissipation member 40 is arranged over the cup body 10 and abuts against the end, located outside the cup body 10, of the semiconductor refrigeration assembly 20;

The base 50 is configured to support the heat-dissipation member 40 and the cup body 10 and to supply power to the semiconductor refrigeration assembly 20; and An air duct communicated with the outside and a fan 52 disposed in the air duct are arranged in the base 50, and an air outlet of the air duct faces the heat-dissipation member 40.

From the above description, the utility model has the following beneficial effects: the heat-dissipation member serving as a cup bottom of the cup body is directly disposed on the base, and the fan located in the base directly blows wind towards the heat-dissipation member exposed to air while the base supplies power to the semiconductor refrigeration assembly, so that heat of the heat-dissipation member can be dissipated rapidly, and a better heat-dissipation effect is fulfilled.

Furthermore, a groove 51 used for containing the heat-dissipation member 40 is formed in the base 50.

From the above description, the groove 51 prevents the cup body 10 from falling down during refrigeration or heating.

Furthermore, an electrode pin 54 is arranged on a supporting face, used for supporting the heat-dissipation member 40, of the base 50, a conductive electrode 14 corresponding to the electrode pin 54 is arranged on the heat-dissipation member 40 and is electrically connected to the semiconductor refrigeration assembly 20, and the electrode pin 54 is electrically connected to a preset external power supply.

From the above description, the cup body 10 and the heat-dissipation member 40 are arranged on the base 50, the electrode pin 54 is connected with the conductive electrode 14, and the base 50 is electrically connected to the external power supply to supply power to the semiconductor refrigeration assembly 20.

Furthermore, the cup body 10 comprises an inner container 13, a shell 11, and an insulation layer 12 clamped between the inner container 13 and the shell 11, and the other end of the semiconductor refrigeration assembly 20 is attached to the outer surface of the bottom wall of the inner container 13.

From the above description, the insulation layer 12 has an insulation effect on the inner container 13.

Furthermore, a temperature sensor 15 is clamped between the inner container 13 and the insulation layer 12.

From the above description, the temperature sensor 15 is able to sense the temperature of the inner container 13.

Furthermore, the semiconductor refrigeration cup further comprises a seal ring 30, an opening is formed in the bottom of the shell 11 and is located around the heat-dissipation member 40, and the seal ring 30 is clamped between the heat-dissipation member 40 and the shell 11.

From the above description, the seal ring 30 is configured so that the airtightness of the bottom of the cup body 10 is improved, and the whole cup body 10 can be washed with water.

Furthermore, a foot pad 53 is arranged at the bottom of the base 50, an air inlet of the air duct is located at the bottom of the base 50, the air outlet of the air duct is located at the top of the base 50, and air exhausted via the air outlet flows through the heat-dissipation member 40.

Embodiment 1

Referring to FIG. 1-FIG. 2, a semiconductor refrigeration cup comprises a semiconductor refrigeration assembly 20, a heat-dissipation member 40, a cup body 10, and a base 50, wherein the semiconductor refrigeration assembly 20 is embedded in the bottom wall of the cup body 10 and has an end exposed out of the cup body 10.

The heat-dissipation member 40 is arranged over the bottom of the cup body 10 and abuts against the end, located outside the cup body 10, of the semiconductor refrigeration assembly 20.

The base 50 is configured to support the heat-dissipation member 40 and the cup body 10 and to supply power to the semiconductor refrigeration assembly 20, an air duct communicated with the outside and a fan 52 disposed in the air duct are arranged in the base 50, and an air outlet of the air duct faces the heat-dissipation member 40.

Embodiment 2

Referring to FIG. 1-FIG. 2, this embodiment provides a semiconductor refrigeration cup which comprises a cup body 10, a semiconductor refrigeration assembly 20, a seal ring 30, a heat-dissipation member 40, and a base 50.

The cup body 10 comprises an inner container 13, a shell 11, and an insulation layer 12 clamped between the inner container 13 and the shell 11, a temperature sensor 15 is clamped between the inner container 13 and the insulation layer 12, an opening is formed in the bottom of the shell 11 and is located around the heat-dissipation member 40, and the seal ring 30 is clamped between the heat-dissipation member 40 and the shell 11, so that water is prevented from flowing into a space between the heat-dissipation member 40 and the shell 11.

The semiconductor refrigeration assembly 20 is embedded in the bottom of the insulation layer 12. In this embodiment, the semiconductor refrigeration assembly 20 comprises a semiconductor refrigeration sheet 21, one end of the semiconductor refrigeration sheet 21 is attached to the outer surface of the bottom wall of the inner container 13, and the other end of the semiconductor refrigeration sheet 21 stretches out of the insulation layer 12 and extends towards the opening of the shell 11 to make contact with the heat-dissipation member 40.

A groove 51 is formed in the base 50 to contain the heat-dissipation member 40 and to support the cup body 10, an electrode pin 54 is arranged on a supporting face, used for supporting the heat-dissipation member 40, of the groove 51, a conductive electrode 14 corresponding to the electrode pin 54 is arranged on the heat-dissipation member 40 and is electrically connected to the semiconductor refrigeration assembly 20, and the electrode pin 54 is electrically connected to a preset external power supply.

An air duct and a fan 52 disposed in the air duct are arranged in the base 50, a foot pad 53 is arranged at the bottom of the base 50, an air inlet of the air duct is located at the bottom of the base 50, and an air outlet of the air duct is located at the top of the base 50, and air exhausted via the air outlet flows through the heat-dissipation member 40, as shown in FIG. 2.

In conclusion, the semiconductor refrigeration cup provided by the utility model has a good heat-dissipation effect, can be directly heated or refrigerated when placed on the base, and is convenient to use.

The above embodiments are only illustrative ones of the utility model, and are not intended to limit the patent scope of the utility model. All equivalent transformations obtained on the basis of the contents in the specification and drawings, or direct or indirect applications to relevant technical fields, should also fall within the patent protection scope of the utility model.

What is claimed is:

1. A semiconductor refrigeration cup, comprising a semiconductor refrigeration assembly, a heat-dissipation member, a cup body, and a base, wherein the semiconductor refrigeration assembly is embedded in a bottom wall of the cup body and has an end exposed out of the cup body;

the heat-dissipation member is arranged over a bottom of the cup body and abuts against the end, located outside the cup body, of the semiconductor refrigeration assembly;

the base is configured to support the heat-dissipation member and to supply power to the semiconductor refrigeration assembly; and an air duct communicated with an outside and a fan disposed in the air duct are arranged in the base, and an air outlet of the air duct faces the heat-dissipation member;

wherein an electrode pin is arranged on a supporting face, used for supporting the heat-dissipation member, of the base, a conductive electrode corresponding to the electrode pin is arranged on the heat-dissipation member and is electrically connected to the semiconductor refrigeration assembly, and the electrode pin is electrically connected to a preset external power supply.

2. The semiconductor refrigeration cup according to claim 1, wherein a groove used for containing the heat-dissipation member is formed in the base.

3. A semiconductor refrigeration cup, comprising a semiconductor refrigeration assembly, a heat-dissipation member, a cup body, and a base, wherein the semiconductor refrigeration assembly is embedded in a bottom wall of the cup body and has an end exposed out of the cup body;

the heat-dissipation member is arranged over a bottom of the cup body and abuts against the end, located outside the cup body, of the semiconductor refrigeration assembly;

the base is configured to support the heat-dissipation member and to supply power to the semiconductor refrigeration assembly; and an air duct communicated with an outside and a fan disposed in the air duct are arranged in the base, and an air outlet of the air duct faces the heat-dissipation member, wherein the cup body comprises an inner container, a shell, and an insulation layer clamped between the inner container and the shell, and the semiconductor refrigeration assembly has an end attached to an outer surface of a bottom wall of the inner container.

4. The semiconductor refrigeration cup according to claim 3, wherein a temperature sensor is clamped between the inner container and the insulation layer.

5. The semiconductor refrigeration cup according to claim 3, wherein the semiconductor refrigeration cup further comprises a seal ring, an opening is formed in a bottom of the shell and is located around the heat-dissipation member, and the seal ring is clamped between the heat-dissipation member and the shell.

6. The semiconductor refrigeration cup according to claim 1, wherein a foot pad is arranged at a bottom of the base, an air inlet of the air duct is located at the bottom of the base, the air outlet of the air duct is located at a top of the base, and air exhausted via the air outlet flows through the heat-dissipation member.

* * * * *